(12) United States Patent
Hu et al.

(10) Patent No.: US 8,024,188 B2
(45) Date of Patent: Sep. 20, 2011

(54) METHOD AND SYSTEM OF OPTIMAL SELECTION STRATEGY FOR STATISTICAL CLASSIFICATIONS

(75) Inventors: Junling Hu, Menlo Park, CA (US); Fabrizio Morbini, Rochester, NY (US); Fuliang Weng, Mountain View, CA (US); Xue Liu, Montreal (CA)

(73) Assignee: Robert Bosch GmbH, Stuttgart (DE)

( * ) Notice: Subject to any disclaimer, the term of this patent is extended or adjusted under 35 U.S.C. 154(b) by 1031 days.

(21) Appl. No.: 11/845,008

(22) Filed: Aug. 24, 2007

(65) Prior Publication Data

US 2009/0055176 A1 Feb. 26, 2009

(51) Int. Cl.
*G10L 15/12* (2006.01)

(52) U.S. Cl. ........ 704/240; 704/270; 704/242; 704/238; 704/9; 715/764; 715/804; 715/858; 715/256

(58) Field of Classification Search ............... 704/275, 704/270, 270.1, 240, 236, 238, 242, 9; 715/764, 715/804, 858, 256, 205, 854, 209
See application file for complete search history.

(56) References Cited

U.S. PATENT DOCUMENTS

| | | | | |
|---|---|---|---|---|
| 5,519,809 A * | 5/1996 | Husseiny et al. | ............. | 704/275 |
| 5,579,436 A * | 11/1996 | Chou et al. | ..................... | 704/244 |
| 6,324,513 B1 * | 11/2001 | Nagai et al. | ..................... | 704/275 |
| 6,615,172 B1 * | 9/2003 | Bennett et al. | ................. | 704/257 |
| 7,054,810 B2 * | 5/2006 | Gao et al. | ..................... | 704/231 |
| 7,257,575 B1 * | 8/2007 | Johnston et al. | ..................... | 1/1 |
| 7,277,854 B2 * | 10/2007 | Bennett et al. | ................. | 704/257 |
| 7,286,987 B2 * | 10/2007 | Roy | ............................... | 704/270 |
| 7,392,185 B2 * | 6/2008 | Bennett | ......................... | 704/243 |
| 7,509,258 B1 * | 3/2009 | Roy | ............................... | 704/256 |
| 7,783,492 B2 * | 8/2010 | Bangalore et al. | ............. | 704/275 |
| 2004/0148169 A1 * | 7/2004 | Baker | ........................... | 704/254 |
| 2004/0158468 A1 * | 8/2004 | Baker | ........................... | 704/238 |
| 2004/0215449 A1 * | 10/2004 | Roy | ............................... | 704/211 |
| 2004/0260543 A1 * | 12/2004 | Horowitz et al. | ............. | 704/221 |
| 2005/0080625 A1 * | 4/2005 | Bennett et al. | ................. | 704/249 |
| 2007/0233497 A1 * | 10/2007 | Paek et al. | ..................... | 704/270 |

(Continued)

FOREIGN PATENT DOCUMENTS

WO    WO 00/16311 A    3/2000

OTHER PUBLICATIONS

Form PCT/ISA/220, "PCT Notification of Transmittal of the International Search Report and the Written Opinion of the International Searching Authority, or the Declaration," 1 pg., Aug. 24, 2007.

(Continued)

*Primary Examiner* — Vijay Chawan
(74) *Attorney, Agent, or Firm* — Dergosits & Noah LLP; Geoffrey T. Staniford

(57) ABSTRACT

An optimal selection or decision strategy is described through an example that includes use in dialog systems. The selection strategy or method includes receiving multiple predictions and multiple probabilities. The received predictions predict the content of a received input and each of the probabilities corresponds to one of the predictions. In an example dialog system, the received input includes an utterance. The selection method includes dynamically selecting a set of predictions from the received predictions by generating ranked predictions. The ranked predictions are generated by ordering the plurality of predictions according to descending probability.

21 Claims, 16 Drawing Sheets

U.S. PATENT DOCUMENTS

2008/0319750 A1* 12/2008 Potter et al. .................. 704/255
2009/0063147 A1* 3/2009 Roy .............................. 704/251

OTHER PUBLICATIONS

Form PCT/ISA/210, "PCT International Search Report," 3 pgs., Aug. 24, 2007.

Form PCT/ISA/237, "PCT Written Opinion of the International Searching Authority," 6 pgs., Aug. 24, 2007.

Junling Hu, Fabrizio Morbini, Fuliang Weng, Xue Liu: "Dynamic n-best Selection and Its Application in Dialog Act Detection" Proceeding of the 8$^{th}$ Sigdial Workshop on Discourse and Dialogue, Sep. 1, 2007-Sep. 2, 2007 pp. 59-62, XP002511792 the whole document.

* cited by examiner

METHOD AND SYSTEM OF OPTIMAL SELECTION STRATEGY FOR STATISTICAL CLASSIFICATIONS

TECHNICAL FIELD

The disclosure herein relates generally to statistical and learning approaches and their applications in various fields, including natural language processing, speech recognition, natural language understanding, dialog act classification, and natural language generation. In particular, this disclosure shows an exemplary application in error detection in dialog systems.

BACKGROUND

In many software applications, statistical classifiers are used to predict potential outputs. A statistical classifier assigns a probability distribution on all potential outputs. The system can select the top n outputs with highest probabilities. This is called n-best selection method, which has been used in speech recognition, natural language understanding, machine translation and other applications. Traditionally n is a fixed number.

Dialog systems are systems in which a person speaks or otherwise enters input to a computer in natural language, in order to accomplish a result. With the rise of microprocessor-controlled appliances and equipment, dialog systems are increasingly used to facilitate the man-machine interface in many applications such as computers, automobiles, home appliances, phone-based customer service, and so on. Dialog systems process the query and access one or more databases to retrieve responses to the query. Dialog systems may also perform other actions based on the request from the user. In order to provide meaningful results with as little user interaction as possible, dialog systems should be designed and implemented to accommodate large variations in the content and format of the queries, as well as the content and format of the responsive data.

Typically, a dialog system includes several modules or components, including a language understanding module, a dialog management module, and a response generation module. In the case of spoken dialog systems, a speech recognition module and a text-to-speech module are included. Each module may include some number of sub-modules. When statistical approaches are used in one or many of these modules, multiple result candidates may be produced. When multiple candidates are produced in conventional systems, the number of candidates is fixed as one of the static parameters.

A persistent issue in modern dialog systems is coverage and the fact that they rely on static rules, data structures and/or data content to process and return responses to user queries. Regardless of how comprehensive a dialog system is, it can never exhaust all the possibilities that people speak. To build a robust system, there is a need for dialog systems that include built-in adaptive components that can be easily trained and updated as new data are collected. Consequently, there is a need for a dialog system that can dynamically store utterances the system does not understand, and use data of these stored utterances to subsequently re-train the system. This eliminates the wasteful effort of training the system on data it already understands.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1A:
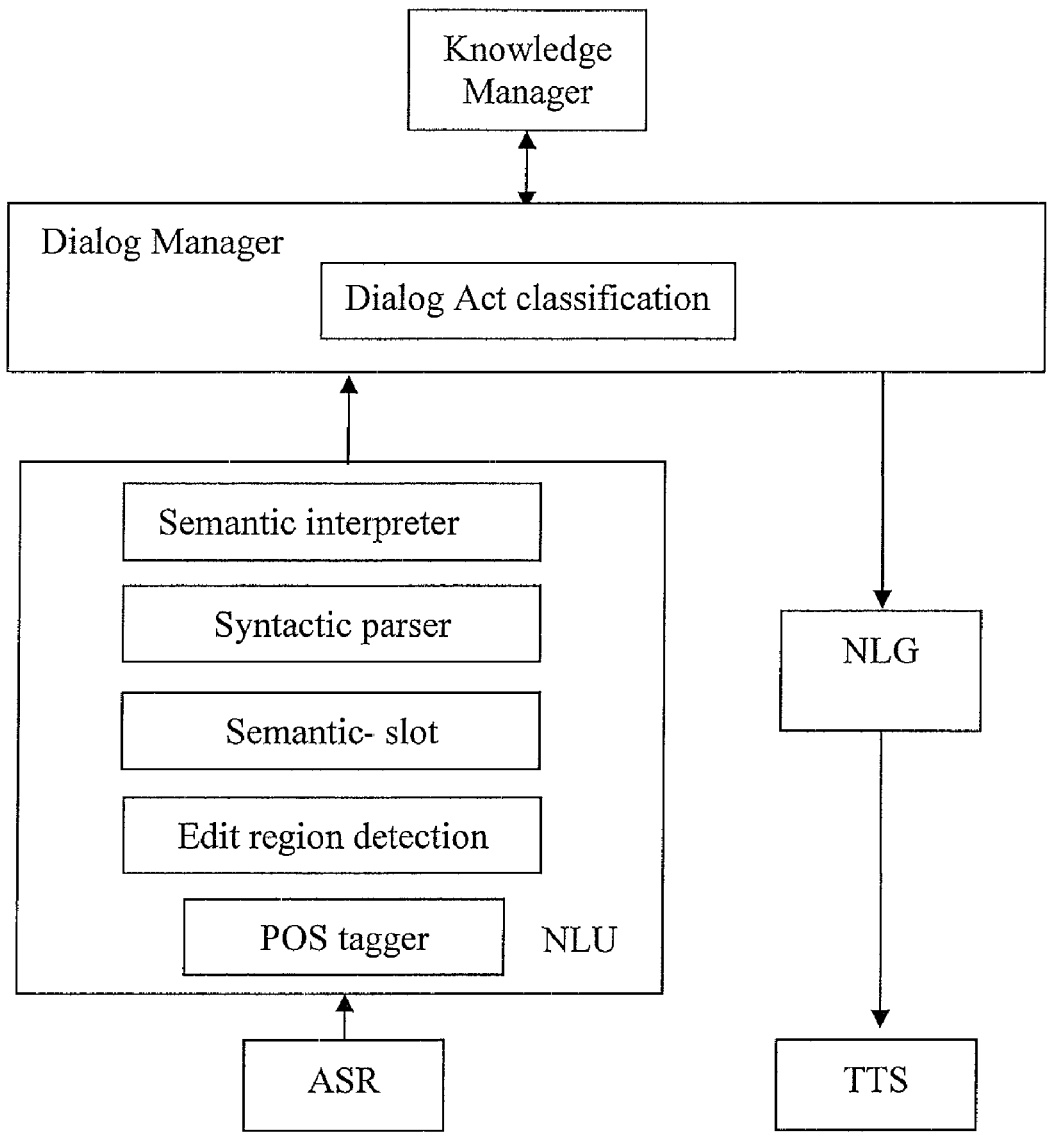
FIG. 1A is a block diagram of a spoken dialog system 100 configured to use the optimal selection or decision strategy described herein, under an embodiment.

An optimal selection or decision strategy is described below. In some instances the optimal selection or decision strategy is described through use of an example dialog system, but the embodiment is not so limited. FIG. 1A is a block diagram of a spoken dialog system 100 configured to use the optimal selection or decision strategy described herein, under an embodiment. The dialog system 100 of this example includes several modules or components, including a language understanding module (e.g., Natural Language Understanding (NLU) module), a dialog management module (e.g., Dialog Manager), and a response generation module (e.g., Natural Language Generator (NLG) module). In the case of the spoken dialog system 100, a speech recognition module (e.g., Automatic Speech Recognition (ASR) module) and a text-to-speech module (e.g., TTS module) are included. Each module may include some number of sub-modules. For example, the NLU module may include a Part of Speech (POS) tagger, an edit region detection module, a proper name identification module, a syntactic parser, a semantic slot identification module, and a semantic interpreter. In the Dialog Manager, dialog act classification is one component. In each of the modules or submodules of the dialog system, when statistical approaches are used, multiple candidates may be produced from the module or submodule. In such cases, the optimal selection strategy described herein may be used.

In the following description, the selection strategy or method is used for deciding whether an utterance is understood or not in host dialog systems, for example dialog system 100. This selection strategy supports coverage extension in a dialog system such that utterances that the system does not understand are dynamically stored and subsequently used to re-train the system (e.g., statistical model of the system). Such a decision has to balance false positive and false negative cases. The embodiments described herein provide a selection strategy, method or component, referred to herein as n*-best selection, based on accumulated probability of variable n-best outputs, where n is determined dynamically based on the classifier distribution of each utterance. A description is also provided of performance of the n*-best selection, also referred to as the n*-best selection algorithm, tested against the traditional n-best methods with fixed n. The performance was measured based on the area under the Receiver Operating Curve (ROC) as described below. Performance results show that n*-best selection consistently performs better than all other n-best methods with any fixed n.

Dynamically selecting n for n-best outcomes under the n*-best selection of an embodiment provides an improved way to use a classifier's output relative to conventional techniques. This is particularly true when the classifier output is used by other stages of a more complex system. The n*-best selection described herein is not limited to classifications of dialog acts but can also be used in other components where n-best outputs are required, for example. A dialog act is an act in a human-to-human or human-to-machine dialog or dialog event that expresses intended actions via words, such as a request, a question, a confirmation, etc.

The dialog system of an embodiment includes more comprehensive coverage of the possible utterances of human beings by providing a system with built-in adaptive components (e.g., Statistical Natural Language Understanding (NLU) modules, classifier-based semantic interpreters, etc.) that can be easily updated with new data. The dialog system of an embodiment is configured to allow built-in adaptive component to be trained and updated as new data are collected. Coverage extension is provided in an embodiment by dynamically storing utterances that the system does not understand, and using data of the stored utterances to re-train the system. This configuration eliminates the wasteful effort of training the system on data it already understands by using a small sample of data points selected from a large pool for training, to minimize the cost of labeling.

The n*-best selection of an embodiment is similar to the traditional n-best selection except that n is dynamically chosen for each input utterance based on properties of the classifier's output for that utterance. If the sum of the probabilities assigned to the first n classes is above a certain threshold, the system decides it is confident on its classification of the user's utterance. Otherwise, the system will declare it does not understand the sentence and save it for later training.

In the following description, numerous specific details are introduced to provide a thorough understanding of, and enabling description for, embodiments of the dialog system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1B:
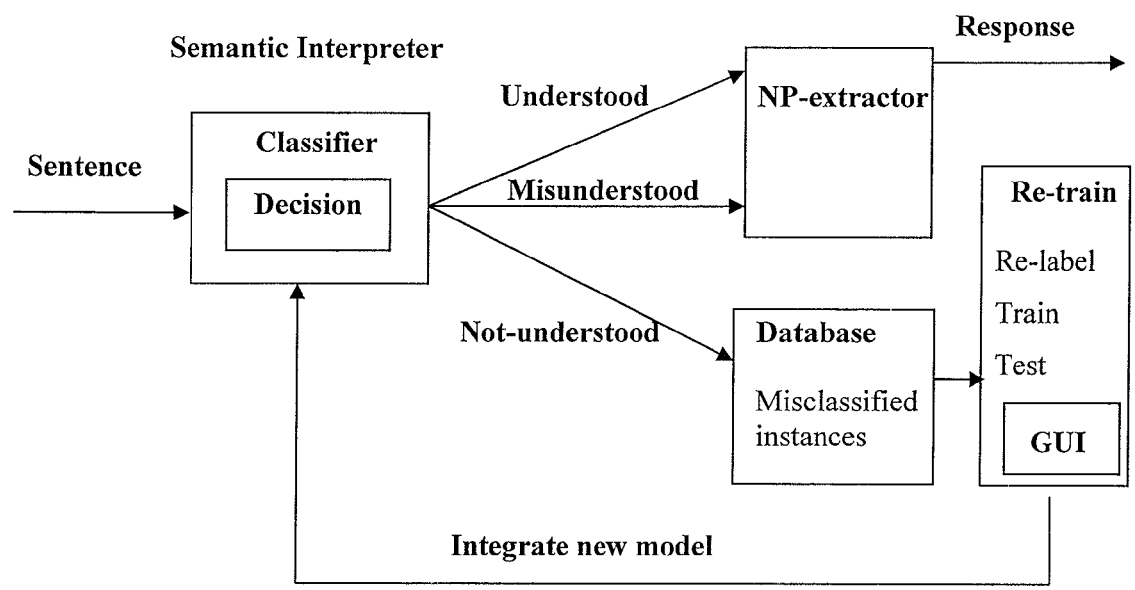
FIG. 1B is a block diagram of an adaptive dialog system (ADS), under an embodiment.

FIG. 1B is a block diagram of an adaptive dialog system (ADS), under an embodiment. Components of the ADS are configured and function, individually and/or collectively, to automatically identify and store user utterances that are not understood. The not-understood utterances are used for later training, as described below. The ADS includes a classifier coupled to a database. The classifier is also coupled to a noun phrase (NP) extractor (NP-extractor) of the host dialog system. A retraining component or module is coupled between the classifier and the database. The retraining component of an embodiment includes a graphical user interface (GUI).

The classifier receives an utterance or sentence as an input. The classifier uses features computed from the parse tree of the user utterance to make predictions on the user's dialog acts. The classifier includes or is coupled to a decision component that is configured to determine a level of confidence associated with the result of the classifier. The decision component is described in detail below. If the classifier determines the ADS is relatively more confident about the result, it will classify the utterance as "Understood" and transfer or pass the result to the NP-extractor and/or other components or stages of the ADS or other host system(s).

When the classifier is confident, it can still return results that may be incorrect or relatively less confident; in this case the utterance is classified as "Misunderstood". Utterances classified as Misunderstood, while sometimes hard to detect, are also transferred to the NP-extractor and/or other components or stages of the ADS.

If the decision component determines the ADS is not confident or relatively much less confident about the result of the classifier, the utterance is classified as "Not-understood". The information or result of an utterance classified as Not-understood is transferred to the database where it is saved for later training. The database stores information related to the utterances classified as not understood by the ADS. The utterance, its parse tree and the current label assigned by the classifier are stored in the database, for example, but the database is not limited to storing all of this data or information or only this data or information. Additionally, the ADS produces an output including a response to the user (e.g., "I don't understand") in response to the not-understood utterance.

The ADS components can be components of a single system, multiple systems, and/or geographically separate systems. The ADS components can also be subcomponents or subsystems of a single system, multiple systems, and/or geographically separate systems. The ADS components can be coupled to one or more other components (not shown) of a host system or a system coupled to the host system.

The ADS of an embodiment includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. More specifically, the systems can include, to name a few, security systems with a dialog interface, appliances with a language interface, phone-based customer support and technical support systems, and automobile products or components with language interfaces, including for example navigation, local information search, and in-car entertainment systems. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the IDSS, and/or provided by some combination of algorithms. The ADS methods described herein can be implemented in one or more of software algorithm(s), programs, firmware, hardware, components, circuitry, in any combination.

The ADS components can be located together or in separate locations. Communication paths couple the ADS components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Figure 2:
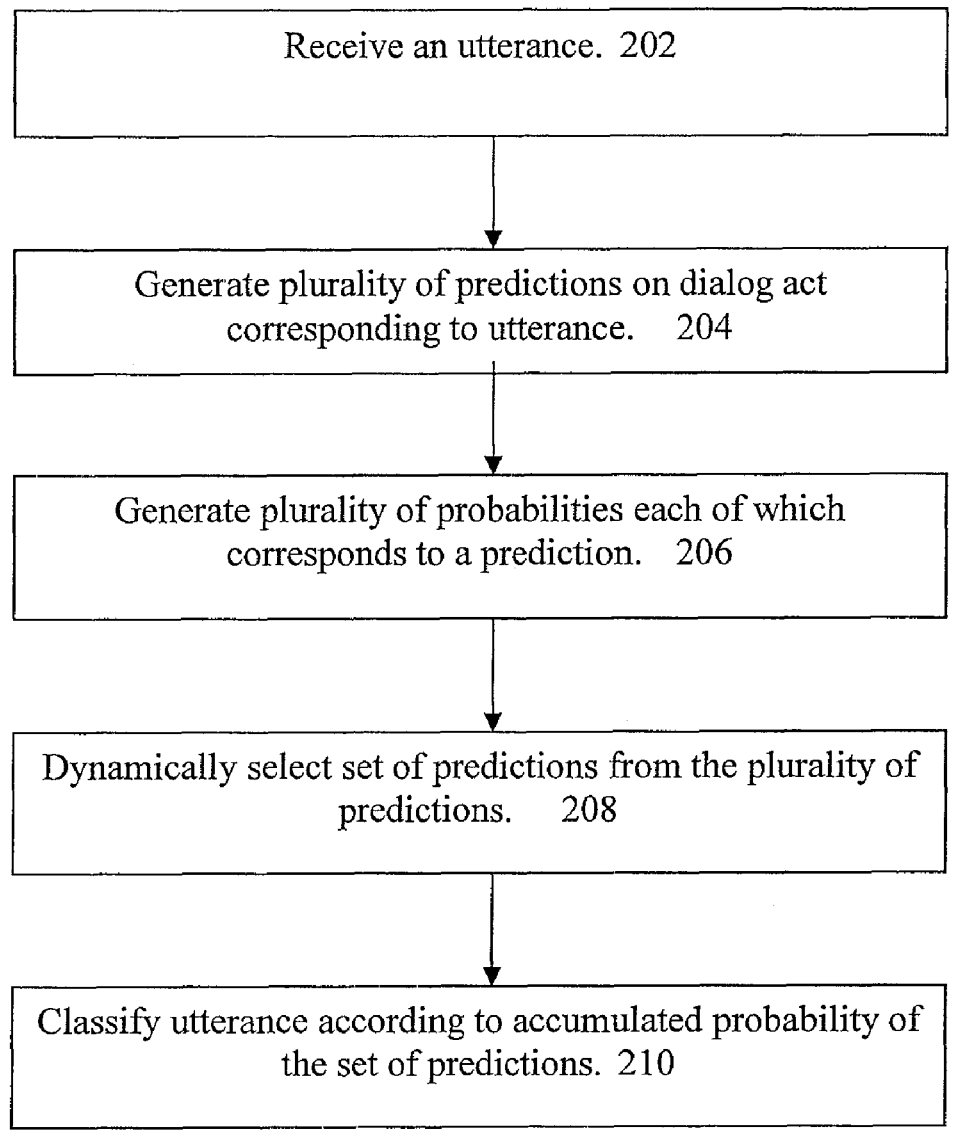
FIG. 2 is a flow diagram for classifying an utterance, under an embodiment.

FIG. 2 is a flow diagram for classifying an utterance, under an embodiment. One or more components of the ADS are configured and/or function to receive 202 an utterance. A plurality of predictions on a dialog act is generated 204 corresponding to the utterance. The ADS generates 206 a plurality of probabilities each of which corresponds to a prediction. The ADS is configured and/or functions to dynamically select 208 a set of predictions from the plurality of predictions, and classified 210 the utterance according to an accumulated probability of the set of predictions.

The retraining component of the ADS is coupled to and/or includes a GUI that enables a human user to quickly re-label (e.g., hand label) the utterances classified as Not-understood and stored in the database. The ADS displays via the GUI the possible dialog acts among which to select labels, initially highlighting the ones chosen by the classifier as suggestions to the human user. The retraining component uses data of the re-labeled utterances to train the classifier based on the old training data and the new re-labeled data. Assuming there were n data points prior to the Not-understood utterance, and the number of Not-understood utterances is m, the new training data will have n+m data points. The newly trained model can be incorporated into the running system without need of restarting.

Figure 3:
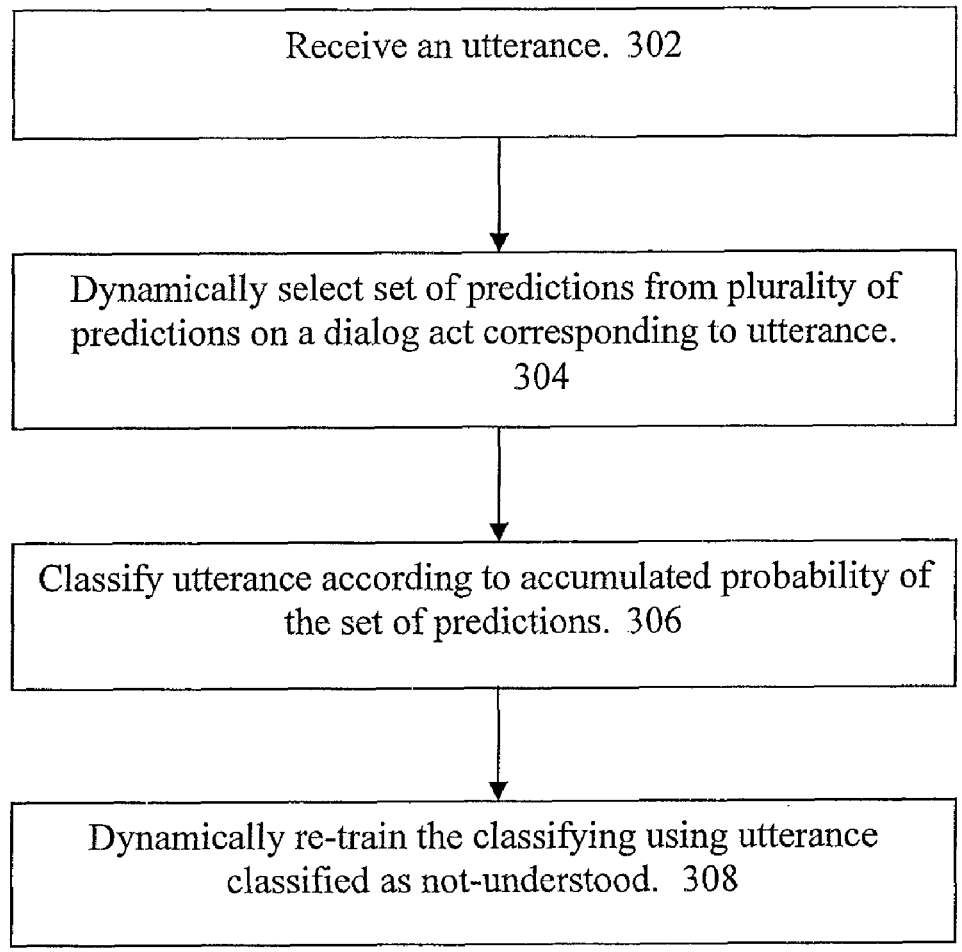
FIG. 3 is a flow diagram for training a dialog system, under an embodiment.

FIG. 3 is a flow diagram for training a dialog system, under an embodiment. One or more components of the ADS are configured and/or function to receive 302 an utterance. The ADS dynamically selects 304 a set of predictions from a plurality of predictions on a dialog act corresponding to the utterance. The utterance is classified 306 according to an accumulated probability of the set of predictions. The ADS is configured and/or functions to dynamically re-train 308 the classifying using the utterance when the utterance is classified as not-understood.

Figure 4:
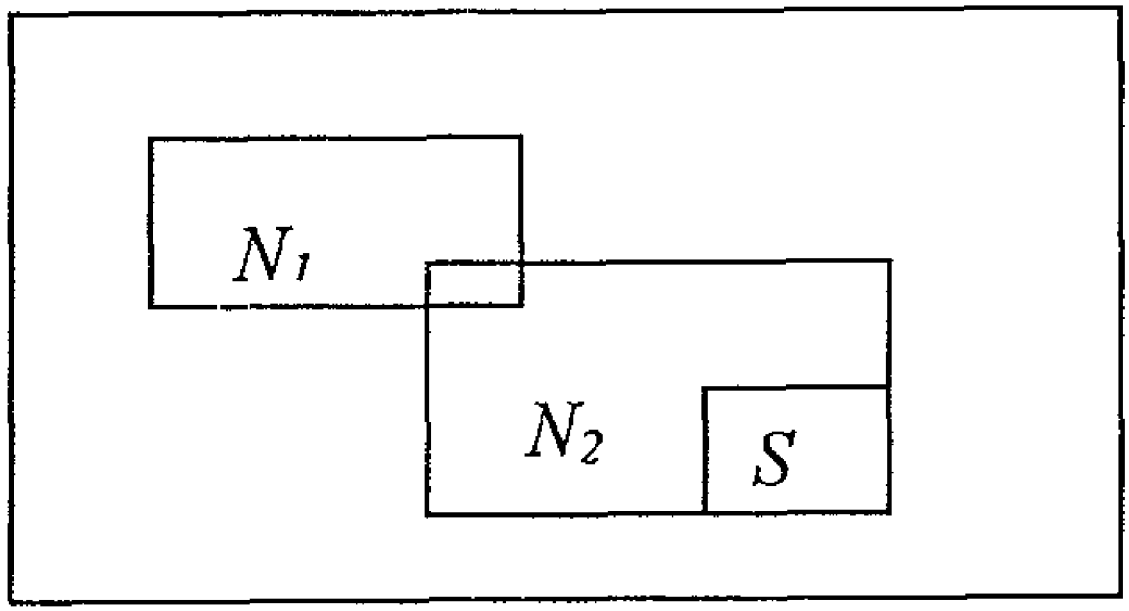
FIG. 4 is a block diagram of the relationship between data sets identified in active learning as applied to an example of the ADS, under an embodiment.

The decision regarding confidence associated with interpreting a sentence translates into a decision on whether to select that sentence for labeling and re-training. In this sense, this decision problem is similar to or the same as active leaning. FIG. 4 is a block diagram of the relationship between data sets identified in active learning as applied to an example of the ADS, under an embodiment. Assuming that the original training set is $N_1$, and new data comes from a fixed set $N_2$, the decision is whether to select that data for human labeling. When a data point is selected for human labeling, it is saved to a set represented as S. In active learning, the goal is to determine a good set S, so that it improves the model that was previously trained on dataset $N_1$ with reduced human labeling effort.

Selective sampling is equivalent to active learning. The unique features of active learning as applied to the ADS of an embodiment include that only one data point can be selected each time. The selection of one data point each time makes the active learning of an embodiment different from conventional embodiments in which batch sampling is allowed.

The unique features of active learning as applied to the ADS also result in each selection of a data point being independent from the previous one. Each selection of a data point being independent from the previous one makes the active learning of an embodiment different from conventional active learning where a feedback from previous decisions is used to help the sampling in the next round (e.g., Thomas Osugi, Deng Kun, and Stephen Scott. 2005. Balancing Exploration and Exploitation: A New Algorithm for Active Machine Learning boundaries. *Proceedings of the Fifth IEEE International Conference on Data Mining* (ICDM '05)).

Furthermore, the unique features of active learning as applied to the ADS include consideration that a wrong selection affects system performance nearly immediately. The active learning of an embodiment also differs from conventional active learning in that it is performed in real-time or near real-time, which is in contrast to conventional active learning in which any learning is done offline on a static corpus.

An aspect of active learning involves sample selection criterion. Sample selection criterion under an embodiment involves a decision, for every sample, as to whether to retain the sample for later labeling and training. The sample selection is generally made using committee-based selection or certainty-based selection. The ADS uses certainty-based selection (used by Gokhan Tur, Dilek Hakkani-Tür and Robert E. Schapire. 2005. Combining active and semi-supervised learning for spoken language understanding. *Speech Communication*, 45(2):171-186, 2005) but is not so limited.

Certainty-based learning chooses a data point based on confidence on the classifier outcome. A statistical classifier (such as Maximum Entropy or Bayesian classifier) returns a probability distribution for all possible classes. Typically, these probabilities are used to estimate the classifier's confidence on its decisions. Operations under the ADS of an embodiment estimate the classifier's confidence by sorting the classifier outputs from highest to lowest probability. A cut-off point (n*) is determined among the sorted classifier outputs that defines the set of classes returned as most probable outputs by the classifier. The sum of the probabilities of all returned classes is calculated for sorted classifier output probabilities occurring prior to the cut-off point. If this cumulative probability is less than a predefined threshold then the ADS decides that the classifier is not confident of its classification. If the cumulative probability is at or above the predefined threshold then the ADS decides that the classifier is confident of its classification and sends or transfers the result to the dialog manager.

Figure 5:
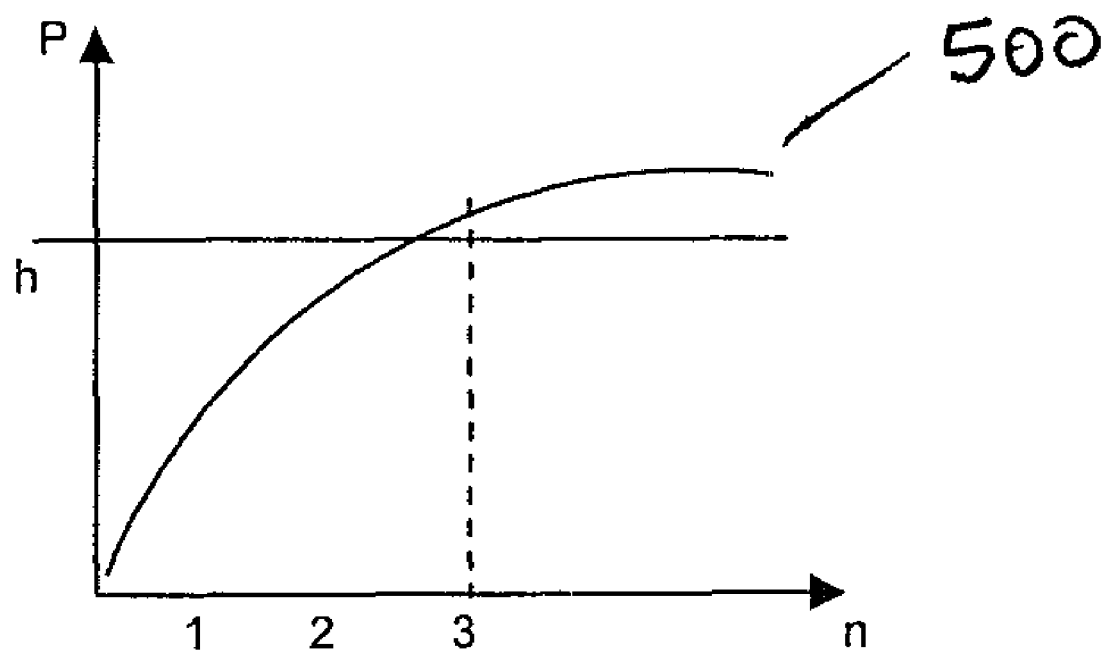
FIG. 5 shows an accumulated probability curve, under an embodiment.

FIG. 5 shows an accumulated probability curve 500, under an embodiment. The predetermined threshold, as described above, is represented as h. The accumulated probability curve 500 is defined as $$P(n) = p_1 + p_2 + \ldots + p_n,$$

where $p_1$ is the probability associated with the first class, and $p_n$ is the probability associated with n-th class. Note that the probabilities are sorted from highest to lowest, thus $$p_1 \geq p_2 \geq \ldots \geq p_n.$$

Figure 6:
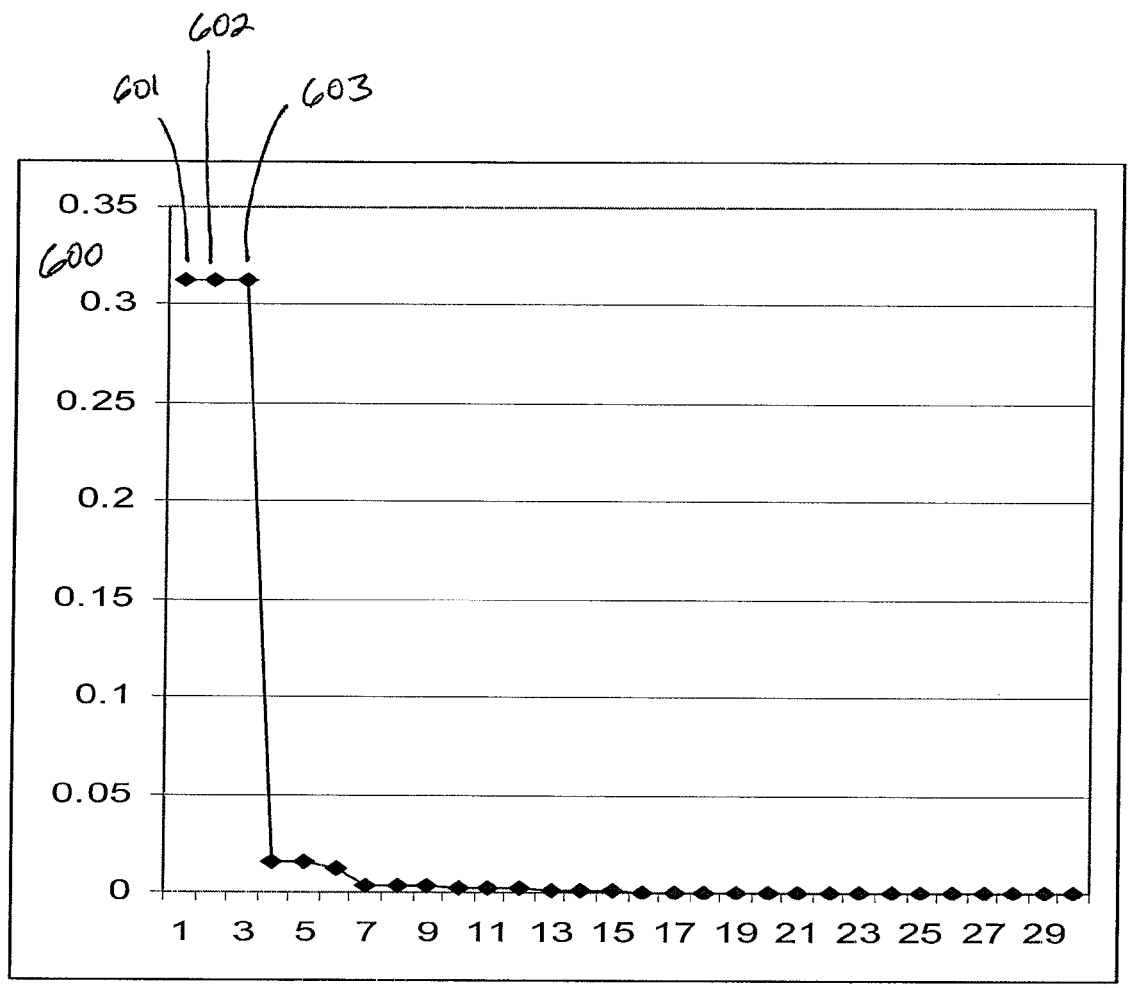
FIG. 6 shows an example of distributions returned by the ADS classifier for a given input sentence or utterance, under an embodiment.

In certainty-based active learning, it is typical to choose the best class returned by the classifier (e.g., Tur et al, 2005), and this is referred to as a 1-best method. However, this is not ideal in the ADS of an embodiment because a sentence can be mapped to multiple dialog moves. Therefore, the classifier may return a group of classes that are very close to each other. FIG. 6 shows an example of distributions 600 returned by the ADS classifier for a given input sentence or utterance, under an embodiment. Referring to this plot 600 of example probability distributions, each of the top three classes 601-603 (corresponding to values of n of 1, 2, and 3, respectively) has approximately a 30% probability. Using the 1-best method, this instance will be returned as low-confidence. However, one of these top three classes may be the correct class. When the top three class selections are sent to the dialog manager, the dialog manager can then make the final choice based on context and dialog history.

The n-best method has been used extensively in speech recognition and NLU, and is also widely used in machine translation (e.g., Kristina Toutanova and Hisami Suzuki, "Generating Case Markers in Machine Translation", Human Language Technologies 2007: The Conference of the NAACL; Proceedings of the Main Conference, April, 2007, Rochester, N.Y. Association for Computational Linguistics, pages: 49-56, http://www.aclweb.org/anthology/N/N07/N07-017). Given that the system has little information on what is a good translation, all potential candidates are sent to a later stage under the n-best method, where a ranker makes a decision on the candidates. In most of these applications, the number of candidates n is a fixed number.

Instead of choosing a fixed number n for n-best, the ADS described herein sets n dynamically based on the classifier's distribution for each utterance. The dynamic setting of n is referred to herein as n*-best selection and is used by the ADS of an embodiment. Therefore, n*-best is a variant of n-best where n changes from case to case. The n*-best selection selects the number of classes returned from a model, such that the number n* satisfies the following property:

$$n^* = \underset{n}{\operatorname{argmax}}(p_n - p_{n+1}) \quad \text{Equation (1)}$$

where $p_n$ and $p_{n+1}$ are the probabilities of class n and class n+1 respectively. In other words, n* is the cut-off point that maximizes the drop $p_n - p_{n+1}$.

In the distribution 600 described above (FIG. 6), for example, using n*-best, n*=3 because $p_3 - p_4 = 0.29$ is higher than all other drops. In other words, for this example, the ADS will return the 3-best candidates.

Figure 7:
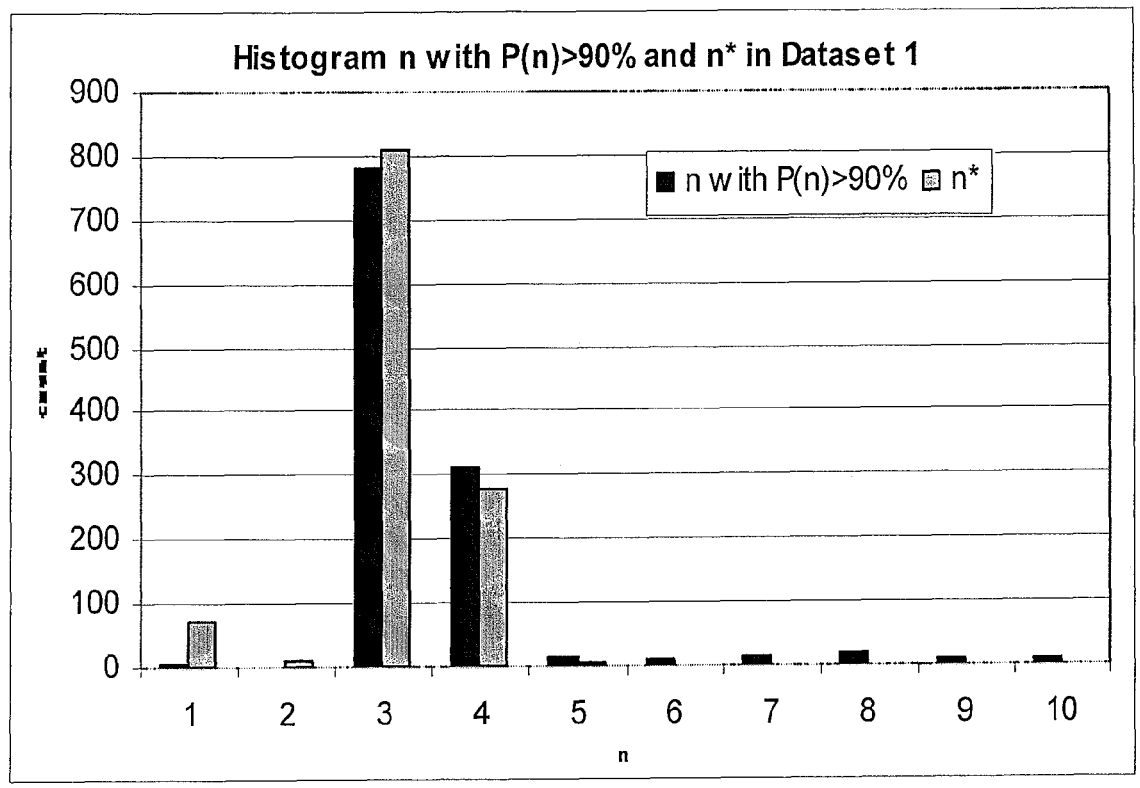
FIG. 7 shows a histogram of n* and n in a first dataset of 1178 points, under an embodiment.
Figure 8:
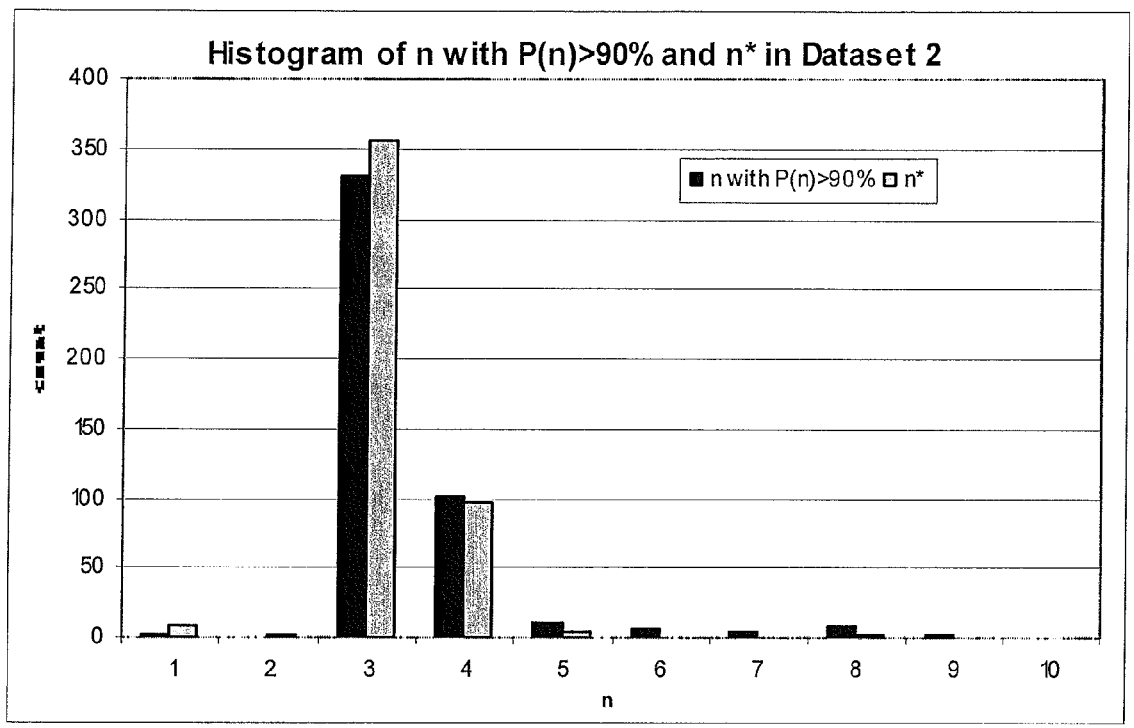
FIG. 8 shows a histogram of n* and n in a second dataset of 471 points, under an embodiment.

FIG. 7 shows a histogram of n* and n in a first dataset of 1178 points. This first dataset shows that approximately 800 cases need three (3) classes (n=3) to return accumulative probability P(n) of 90%. For another 300 cases, there is a need to return four (4) classes in order to have 90% confidence. FIG. 8 shows a histogram of n* and n in a second dataset of 471 points. Similar results are seen with the second dataset as with the first dataset. Therefore, the use of n-best selection with a fixed number n (e.g., 3-best, 4-best, etc.) generally provides less than optimal results. The plot of the histogram of n* in each of the first and second datasets however finds n* is close to the distribution of the optimal n that generates $P(n) > 90\%$.

Figure 9:
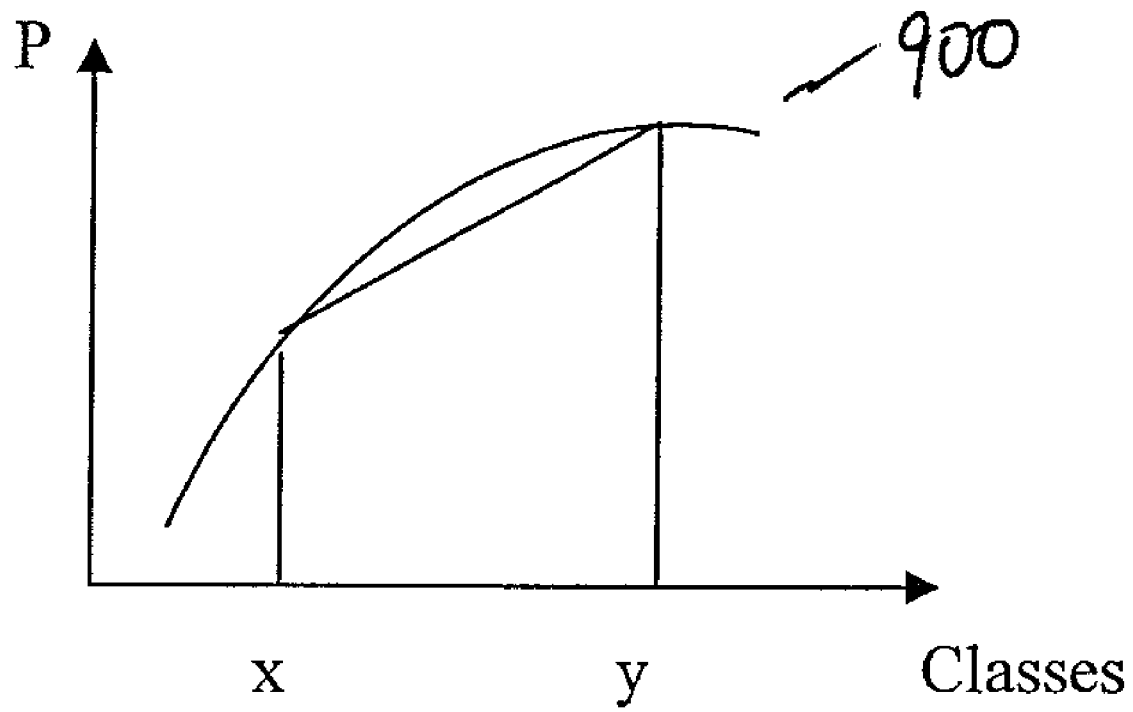
FIG. 9 shows an accumulated probability distribution P of the learned classifier.

Another way to consider or evaluate the n*-best selection involves use of accumulative probability. FIG. 9 shows an accumulated probability distribution P of the learned classifier. It is observed that the accumulated probability distribution curve 900 of the learned classifier is a concave function. Proof that the accumulated probability distribution curve 900 of the learned classifier is a concave function begins by considering that a concave function satisfies the following property $$f\left(\frac{x+y}{2}\right) \geq \frac{f(x) + f(y)}{2}.$$

Considering $$P(x) = p_1 + p_2 + \ldots + p_x, \text{ and } P(y) = p_1 + p_2 + \ldots + p_x + \ldots + p_y$$

then $$\frac{P(x) + P(y)}{2} = p_1 + p_2 + \ldots + p_x + \frac{p_{x+1} + \ldots + p_y}{2}.$$

Substituting y=(x+k), then $$P\left(\frac{x+y}{2}\right) = P\left(x + \frac{k}{2}\right) = p_1 + p_2 + \ldots + p_x\left(p_{x+1} + \ldots + p_{x+\frac{k}{2}}\right)$$

and further substation from above results in $$P\left(\frac{x+y}{2}\right) - \frac{P(x) + P(y)}{2} = p_{x+1} + \ldots + p_{x+\frac{k}{2}} - \frac{p_{x+1} + \ldots + p_{x+k}}{2}$$

$$= \frac{1}{2}\left(\begin{array}{c} p_{x+1} + \ldots + p_{x+\frac{k}{2}} - \\ \left(p_{x+\frac{k}{2}+1} + \ldots + p_{x+k}\right) \end{array}\right) \geq 0$$

The last inequality above is derived from the fact that $$p_1 \geq p_2 \geq \ldots \geq p_m,$$

when the probability is sorted from highest to the lowest.

The derivation of n* is equivalent to maximizing the second derivative of the accumulative probability curve. When the number of classes approaches infinity and n* is chosen based on Equation (1) described above, then $$n^* = \underset{n}{\operatorname{argmax}}(-P''(n+1)).$$

This can be shown by considering $$p_n = P(n) - P(n-1) = \Delta P(n),$$

which leads to, $$p_n - p_{n+1} = \Delta P(n) - \Delta P(n+1) = -\Delta^2 P(n+1).$$

When the number of classes approaches infinity, the accumulative curve becomes continuous. Therefore, $$\Delta^2 P(n+1)$$

can be approximated with $$P''(n+1).$$

Since $$n^* = \underset{n}{\operatorname{argmax}}(p_n - p_{n+1}),$$

then $$n^* = \underset{n}{\operatorname{argmax}}(-P''(n+1)).$$

Given that P(n) is a concave function, as described above, it has the following properties:

$$P'(n) \geq 0 \text{ and } P''(n) \leq 0.$$

The second derivative at point n is the increase in slope of the tangent line to the concave function curve. Therefore the tangent line passing n*+1 has the largest increase in its slope.

An aspect of active learning involves performance evaluation. Performance evaluation of the n*-best selection of an embodiment includes comparing the performance of the n*-best method to the classic n-best selection method using a defined objective function or evaluation metric. In active learning research, the most commonly used evaluation metric is the error rate. The error rate can be written as $$1 - \frac{TP}{TP+FP},$$

where TP represents the number of true positives, and FP represents the number of false positives. While this measure is important, it does not capture the trade-off between giving the user wrong answers (false positive) and rejecting too many properly classified user utterances (false negatives). Therefore the objective function of an embodiment is based on the Receiver Operating Characteristic (ROC) curve. In particular, when using the ROC curve, a better selection criteria is one with a higher area under the ROC curve. Use of the ROC curve in evaluating the performance of the various selection criteria follows.

A set S is defined herein as the collection of data points that are marked as low confidence and will be labeled by a human. A set $N_2$ represents the set of all new data, h represents the confidence threshold, and d represents any data point in $N_2$. The set S can then be defined as:

$$S = \{d : P_d(n) < h, \forall d \in N_2\} \qquad 2$$

Figure 10:
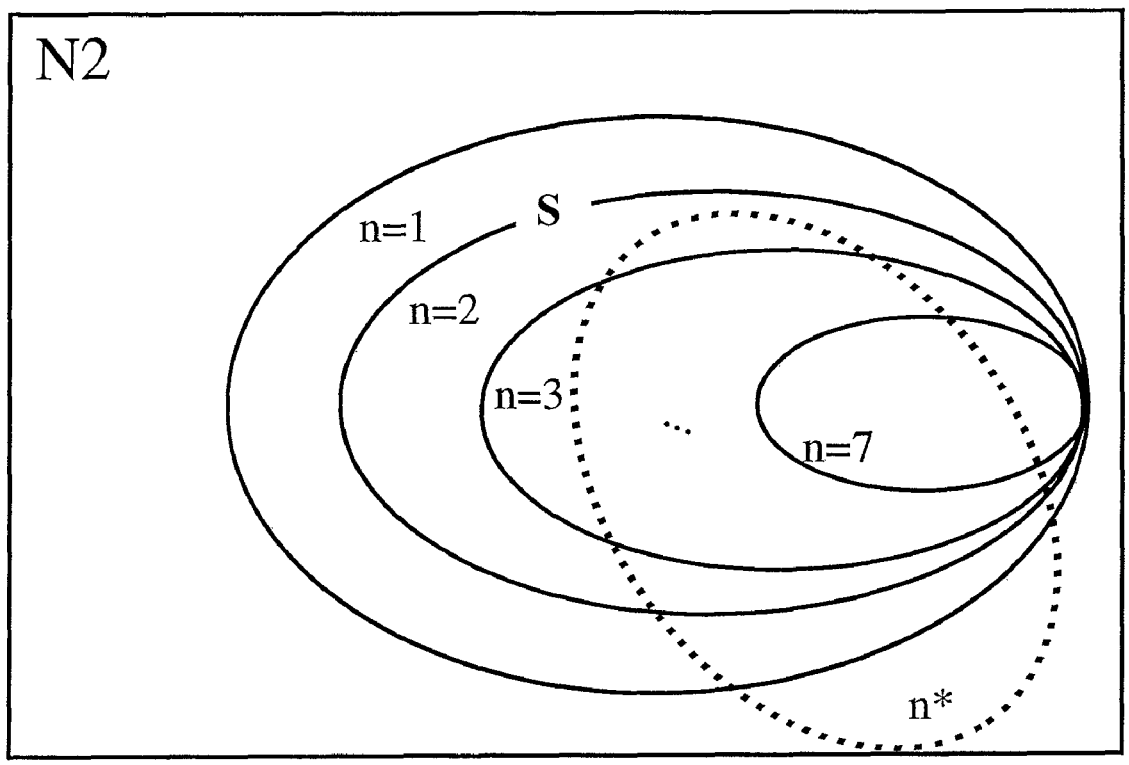
FIG. 10 shows the relationship between the set S of data points marked as low confidence and the value of n.

Therefore, when the cumulative probability of the n-best classes from the classifier is lower than the threshold h, the ADS has no confidence on the classifier results and therefore will save the data for future training. The set S is a function of both n and h, as described above. For a fixed h, the size of the set S will decrease with a larger n. FIG. 10 shows the relationship between the set S of data points marked as low confidence and the value of n.

In addition to true positives (TP) and false positives (FP), the performance evaluation of an embodiment also considers true negatives (TN) and false negatives (FN). If the classifier result is consistent with human labels, they count as a true positive case. The data points in the non-training set ($N_2$–S) can be either a false positive (FP) if the predicted classes for this data point is wrong (not consistent with human label set) or a true positive (TP). Similarly, a data point in S that is consistent with its human label will be a false negative, otherwise a true negative.

The collection of human labels for a data point d is represented herein as $L_d$, and $C_d(n)$ represents the collection of the first n classes returned by the classifier, ranked from the highest to lowest by their probability. Considering the above representations, $$TP = \{d : C_d(n) \cap L_d \neq \phi, \forall d \in N_2 - S\}$$

$$FP = \{d : C_d(n) \cap L_d = \phi, \forall d \in N_2 - S\}$$

$$TN = \{d : C_d(n) \cap L_d = \phi, \forall d \in S\}$$

$$FN = \{d : C_d(n) \cap L_d \neq \phi, \forall d \in S\}$$

The selection criterion of an embodiment produces an optimal S, where the optimal S is one that is small and contains only true negative instances. Therefore, a better performance measure of a selection criterion is the ROC curve because it takes into account also false positive and false negatives.

Figure 11:
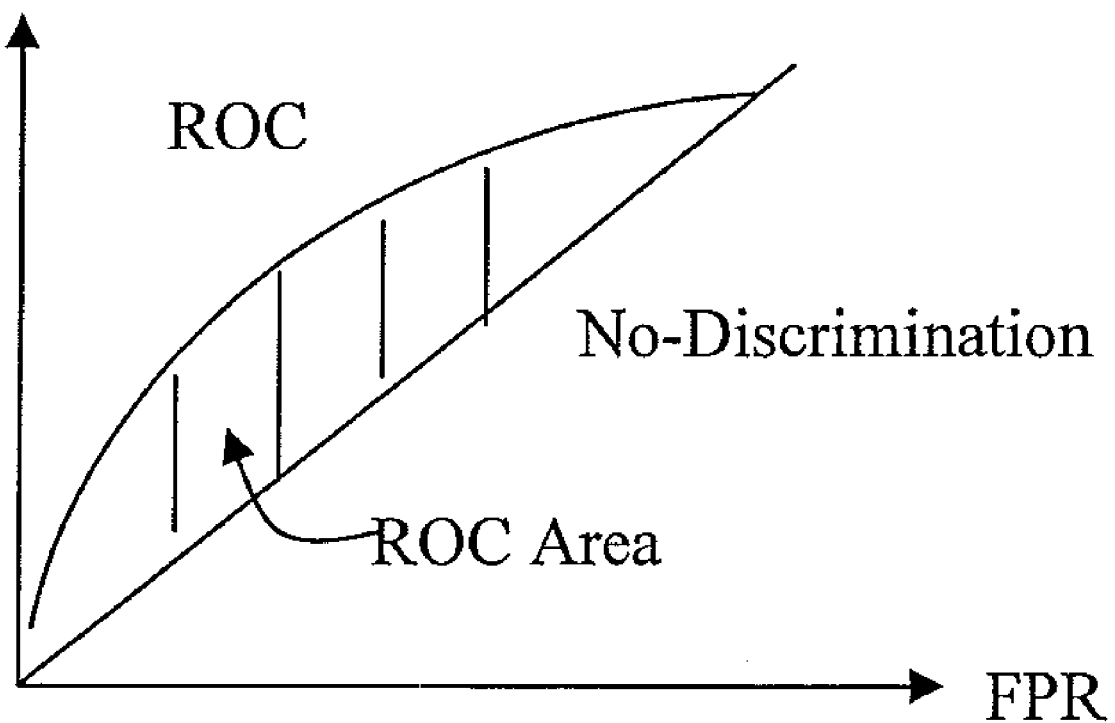
FIG. 11 is a ROC curve used for performance evaluation of the ADS, under an embodiment.

The ROC curve is a graphical plot of the fraction of true positives versus the fraction of false positives. A ROC analysis has attracted attention in numerous fields due to its robustness in imprecise environments. FIG. 11 is a ROC curve used for performance evaluation of the ADS, under an embodiment. The ROC space is defined by a False Positive Rate (FPR) (e.g., x-axis) and True Positive Rate (TPR) (e.g., y-axis), which depicts relative tradeoffs between true positive and false positive. The best possible prediction method would yield a point in the upper left corner or coordinate (0,1) of the ROC space, representing the case in which all only true positives are returned by a particular model; this point corresponds to a perfect classification. The 45 degree diagonal line is referred to as the no-discrimination line and represents the classifier that returns the same percentage of true positive and false positive when compared to the total number of true cases (i.e. TP+FN) and the total number of false cases (i.e. TN+FP) respectively.

The ROC curve is derived by varying the threshold h when the TPR is plotted versus the FPR. The TPR, also referred to as the sensitivity or recall, is represented by the formula $$TPR = \frac{TP}{TP+FN}.$$

The FPR is approximately the quantity one minus specificity, and is represented by the formula $$FPR = 1 - \frac{TN}{FP+TN}.$$

The area under the ROC curve (referred to as AUC) is a summary statistic used to quantify a classifier's performance. The larger the AUC value, the better the classifier performance.

Points above the diagonal line of the ROC curve indicate a better classifier (i.e. one that identifies a higher fraction of TP and TN), while points below the line indicate weaker classifiers. As a result, the area between the ROC curve and the no-discrimination line can be used to indicate the performance of a classifier. This area is commonly known as the discrimination area, and is referred to herein as the ROC area.

Performance of the n*-best selection of an embodiment was evaluated using two data-sets described above with reference to FIG. 7 and FIG. 8. The first dataset contains 1178 user utterances and the second dataset contains 471 utterances. These sample utterances are from the restaurant recommendation domain but are not so limited. The first dataset is referred to in the following description as "large training data" or "LD", and the second dataset is referred to in the following description as "small training data" or "SD". The two data-sets LD and SD are used to simulate two scenarios as follows: Case 1, including a dataset LD and a dataset SD such that the model is trained on a large dataset LD and tested on a small dataset SD; Case 2, including a dataset SD and a dataset LD such that the model is trained on a small dataset SD and tested on a large dataset LD.

All utterances in both datasets LD and SD were hand labeled with dialog acts. There can be more than one dialog act associated with each utterance. An example training instance includes: "(a cheap restaurant), (Query restaurant, Answer, Revision)". The first portion of the training instance is the user utterance, and the second portion of the training instance (referred as $L_d$) is the set of human-labeled dialog acts. In total, in the domain used for these tests, there are 30 possible user dialog acts.

The evaluation presented herein compared n*-best with fixed n-best methods with n approximately in a range of one (1) to six (6). For each of these methods, TP, FP, TN and FN are calculated for values of the threshold h ranging from 0.1 to 1 in steps of 0.05. The TPR and FPR are derived and used to plot a ROC curve.

Figure 12:
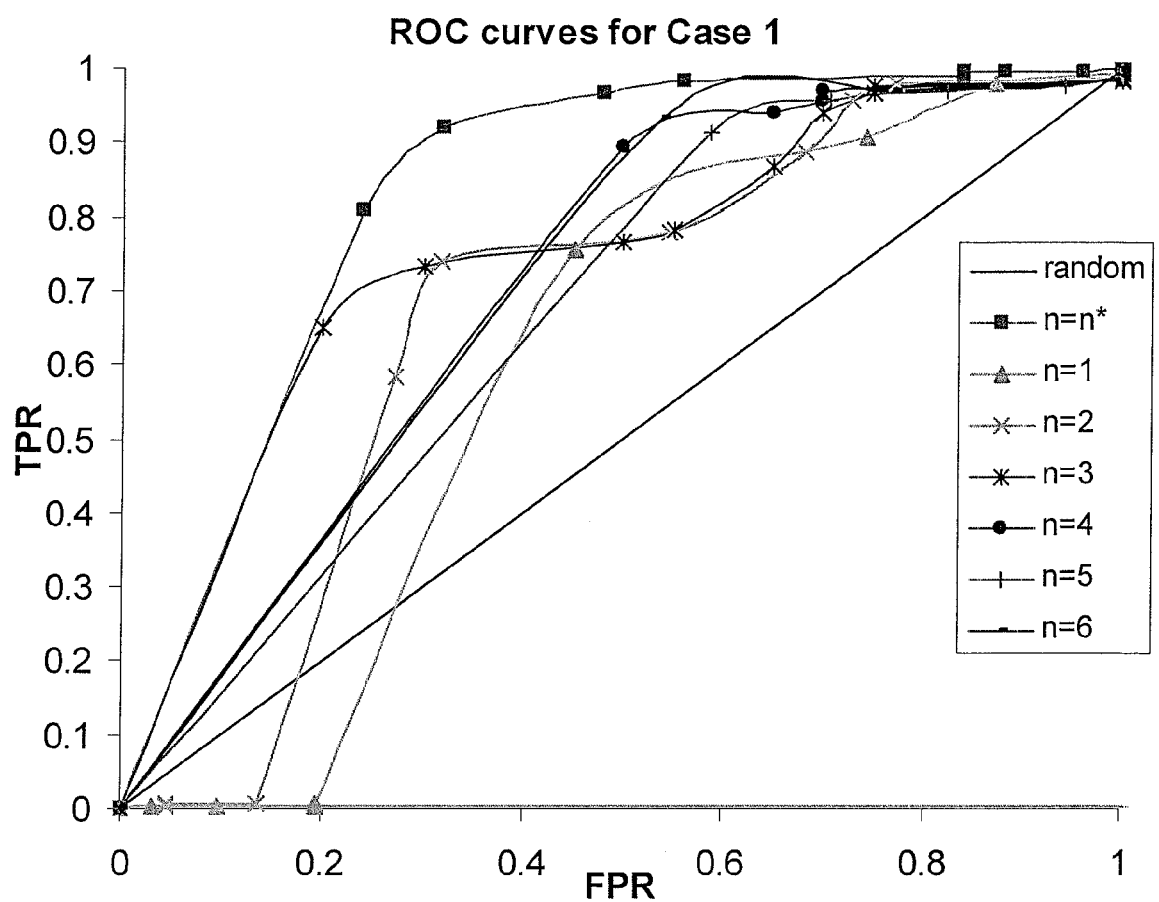
FIG. 12 shows the ROC curves obtained under n*-best selection using example training data of Case 1, under an embodiment.

FIG. 12 shows the ROC curves obtained under n*-best selection using example training data of Case 1, under an embodiment. The example training data is the data under Case 1 described above for which the model is trained on a large dataset LD and tested on a small dataset SD. The ROC curves of the n*-best selection are plotted along with fixed n-best selection with varying values of n for comparison.

The ROC curve for the n*-best selection of an embodiment is generally better in most cases than the other methods with fixed n. In fact, for some values of n, the n-best selection performs under the non-discrimination line (labeled as "random" line). For example, 2-best with a high threshold h will not reach h in most cases because only two (2) nodes are considered in computing the cumulative probability; this results in a large set S containing many FN. This causes the TPR to fall and the FPR to be higher than the TPR.

Figure 13:
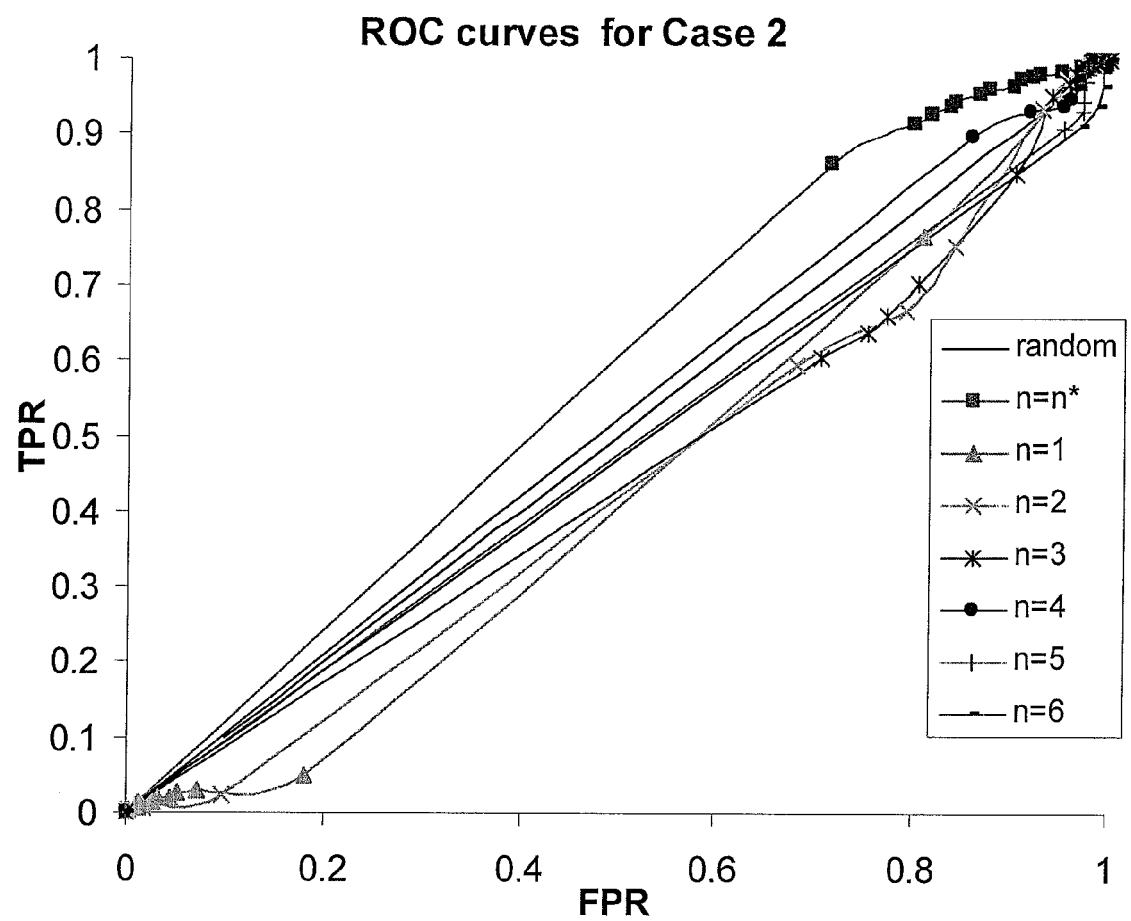
FIG. 13 shows the ROC curves obtained under n*-best selection using example training data of Case 2, under an embodiment.

FIG. 13 shows the ROC curves obtained under n*-best selection using example training data of Case 2, under an embodiment. The example training data is the data under Case 2 described above for which the model is trained on a small dataset SD and tested on a large dataset LD. The ROC curves of the n*-best selection are plotted along with fixed n-best selection with varying values of n for comparison.

The ROC curves for all selection methods (under the example training data of Case 2) are nearer to the non-discrimination line than in the previous example using the example training data of Case 1. This suggests that the classifier has a lower discrimination quality given the small set used for training. However, the n*-best method still generally out-performs the other n-best methods in the majority of scenarios.

Figure 14:
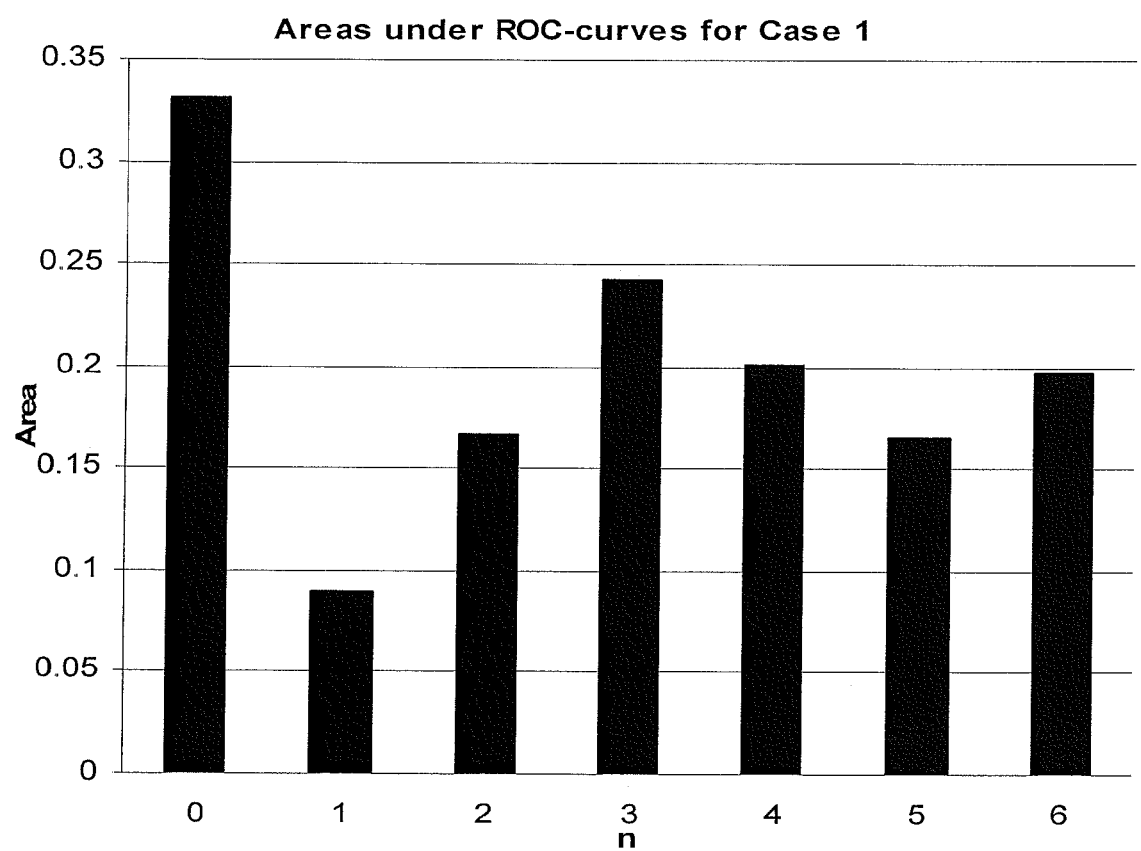
FIG. 14 shows the magnitude of the ROC AUC obtained under n*-best selection (n* represented as n=0) using example training data of Case 1, under an embodiment.

Calculation of the size of the ROC area under the Case 1 and Case 2 examples above provides summary statistics of the performance of n*-best selection compared to the other n-best selection methods. FIG. 14 shows the magnitude of the ROC AUC obtained under n*-best selection (n* represented as n=0) using example training data of Case 1, under an embodiment. The magnitude of the ROC AUC obtained under fixed n-best selection with varying values of n are also provided for comparison. The data plotted as the ROC AUC corresponds to the ROC curves of FIG. 11. The n*-best selection generally out-performs all other n-best selection methods under the Case 1 scenario. The reason behind the good performance of the n*-best selection is the quality of the set S. The n*-best selection produces a set S that, for the same size as other n-best algorithms, includes a higher portion of true negative cases.

Figure 15:
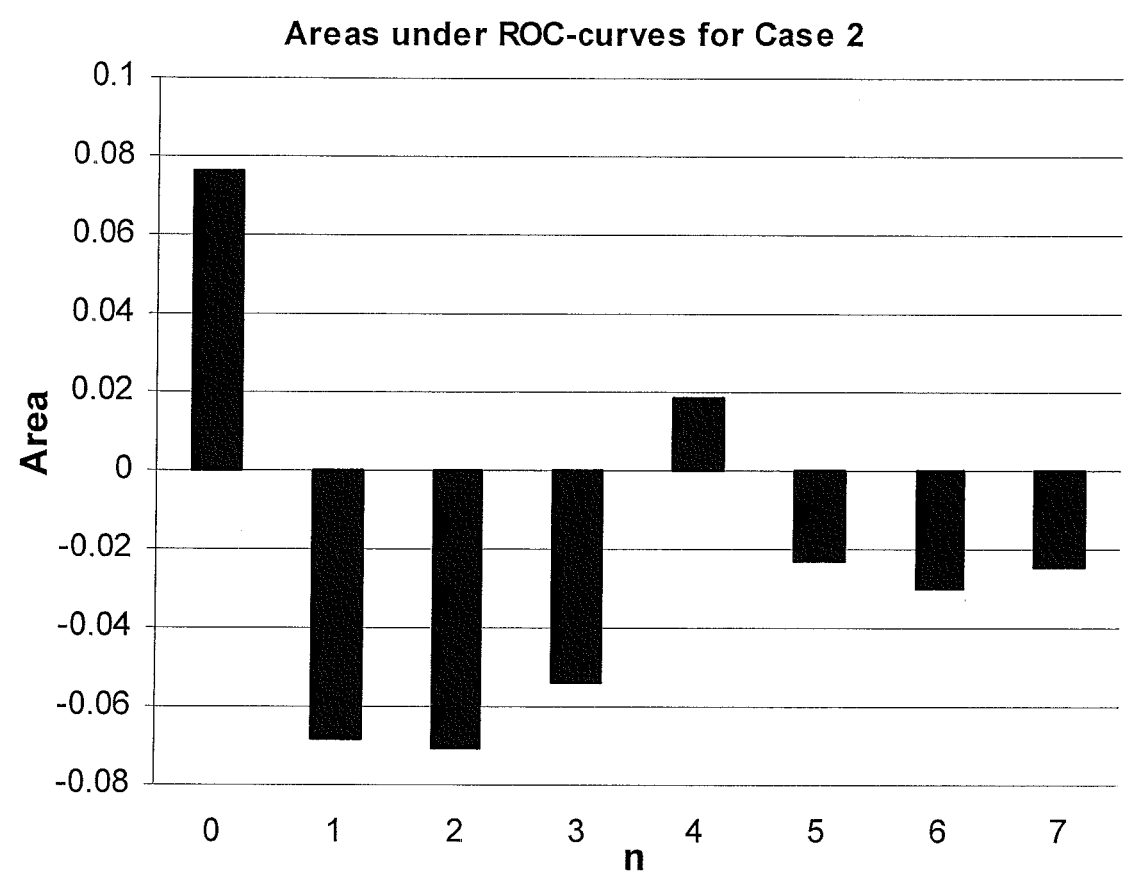
FIG. 15 shows the magnitude of the ROC AUC obtained under n*-best selection (n* represented as n=0) using example training data of Case 2, under an embodiment.

FIG. 15 shows the magnitude of the ROC AUC obtained under n*-best selection (n* represented as n=0) using example training data of Case 2, under an embodiment. The magnitude of the ROC AUC obtained under fixed n-best selection with varying values of n are also provided for comparison. The data plotted as the ROC AUC corresponds to the ROC curves of FIG. 12. The n*-best selection generally out-performs all other n-best selection methods under the Case 2 scenario. Again, the reason behind the good performance of the n*-best selection is the quality of the set S. The n*-best selection produces a set S that, for the same size as other n-best algorithms, includes a higher portion of true negative cases.

Aspects of the dialog system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the dialog system include: microcontrollers with memory (such as electronically erasable programmable read only memory (EEPROM)), embedded microprocessors, firmware, software, etc. Furthermore, aspects of the dialog system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the dialog system is not intended to be exhaustive or to limit the systems and methods to the precise forms disclosed. While specific embodiments of, and examples for, the dialog system are described herein for illustrative purposes, various equivalent modifications are possible within the scope of the systems and methods, as those skilled in the relevant art will recognize. The teachings of the dialog system provided herein can be applied to other systems and methods, not only for the systems and methods described above.

The elements and acts of the various embodiments described above can be combined to provide further embodiments. These and other changes can be made to the dialog system in light of the above detailed description.

In general, in the following claims, the terms used should not be construed to limit the dialog system to the specific embodiments disclosed in the specification and the claims, but should be construed to include all systems that operate under the claims. Accordingly, the dialog system is not limited by the disclosure, but instead the scope of the dialog system is to be determined entirely by the claims.

While certain aspects of the dialog system are presented below in certain claim forms, the inventors contemplate the various aspects of the dialog system in any number of claim forms. Accordingly, the inventors reserve the right to add additional claims after filing the application to pursue such additional claim forms for other aspects of the dialog system.

What is claimed is:

1. A computer-implemented method of processing an input utterance from a user in an adaptive dialog system (ADS), the method comprising:
   a classifier component of the ADS receiving a plurality of predictions and a plurality of probabilities, wherein the predictions predict a probability of correctly recognizing the input utterance;
   the classifier component defining a dynamic threshold value to select one or more predictions of the plurality of predictions;
   a decision component of the ADS dynamically selecting a set of predictions from the plurality of predictions by generating ranked predictions by ordering the plurality of predictions according to descending probability, wherein the dynamic threshold value is selected for the input utterance based on the ordering of the plurality of predictions; and
   a training component of the ADS using a result of the input utterance for retraining the ADS if the probability of correctly predicting the input utterance is below the dynamic threshold value.

2. The method of claim 1, wherein dynamically selecting the set of predictions by the decision component, comprises determining a sequential pair of predictions in the ranked predictions between which the difference in corresponding probabilities is greatest relative to any other sequential pair of predictions, wherein the sequential pair of predictions include a first prediction and a second prediction, the first prediction having a higher probability than the second prediction.

3. The method of claim 2, further comprising the classifier component classifying the received input according to an accumulated probability of the set of predictions, and wherein the dynamic threshold value is modified based on the accumulated probability of the set of predictions.

4. The method of claim 2, wherein dynamically selecting the set of predictions in the decision component, comprises identifying the set of predictions to include those predictions in a group bounded by a highest ranked prediction and the first prediction.

5. The method of claim 1, further comprising:
   generating the plurality of predictions in the classifier component;
   generating the plurality of probabilities each of which corresponds to a prediction; and
   classifying the received input according to an accumulated probability of the set of predictions.

6. The method of claim 5, wherein the classifying in the classifier component, includes classifying the received input as a first input class when the accumulated probability of the set of predictions is at or above a threshold, and classifying the received input as a second input class when the accumulated probability of the set of predictions is below a threshold.

7. The method of claim 5, comprising generating a second plurality of predictions on a second received input, the generating of the second plurality of predictions dynamically using data of at least one input of the first input class.

8. An adaptive dialog system for processing an input utterance from a user, comprising:
   a processor;
   a classifier component coupled to the processor and configured to receive a plurality of predictions and a plurality of probabilities, wherein the predictions predict a probability of correctly recognizing the input utterance, the classifier component further configured to defining a dynamic threshold value to select one or more predictions of the plurality of predictions; and
   a decision component coupled to the processor and configured to dynamically select a set of predictions from the plurality of predictions by generating ranked predictions by ordering the plurality of predictions according to descending probability, wherein the dynamic threshold value is selected for the input utterance based on the ordering of the plurality of predictions.

9. The system of claim 8, wherein the decision component is configured to dynamically select the set of predictions by determining a sequential pair of predictions in the ranked predictions between which the difference in corresponding probabilities is greatest relative to any other sequential pair of predictions, wherein the sequential pair of predictions include a first prediction and a second prediction, the first prediction having a higher probability than the second prediction.

10. The system of claim 9, wherein dynamically selecting the set of predictions by the decision component comprises identifying the set of predictions to include those predictions in a group bounded by a highest ranked prediction and the first prediction.

11. The system of claim 9, wherein the classifier component is configured to classify the received input according to an accumulated probability of the set of predictions, and wherein the dynamic threshold value is modified based on the accumulated probability of the set of predictions.

12. The system of claim 11, wherein the classifier component is configured to generate the plurality of predictions and to generate the plurality of probabilities, each of which corresponds to a prediction of the plurality of predictions, and classify the input according to an accumulated probability of the set of predictions.

13. The system of claim 12, wherein the decision component is configured to classify the input as a first input class when the accumulated probability of the set of predictions is at or above a threshold, and configured to classify the input as a second input class when the accumulated probability of the set of predictions is below a threshold.

14. The system of claim 12, wherein the decision component is configured to dynamically select the set of predictions including generating ranked predictions by ordering the plurality of predictions according to descending probability.

15. The system of claim 12, comprising a database coupled to the decision component, wherein the decision component is configured to transfer inputs classified as the second input class to the database and the database is configured to store the transferred inputs.

16. The system of claim 15, comprising a re-training module coupled to the classifier component and the database, wherein the re-training module is configured to dynamically re-train the classifier using inputs classified as the second input class prior to another plurality of predictions.

17. The system of claim 15, comprising a graphical user interface (GUI) coupled to the database, wherein the GUI is configured to generate a labeled input by applying a label to an input classified as the second input class.

18. A physical, non-transitory computer-readable media including executable instructions which, when executed in a processing system, control selection of output predictions by:

receiving in a classifier component of the processing system, a plurality of predictions and a plurality of probabilities, wherein the predictions predict a probability of correctly recognizing the input utterance;

defining, in the classifier component, a dynamic threshold value to select one or more predictions of the plurality of predictions;

dynamically selecting in a decision component of the processing system, a set of predictions from the plurality of predictions by generating ranked predictions by ordering the plurality of predictions according to descending probability, wherein the dynamic threshold value is selected for the input utterance based on the ordering of the plurality of predictions; and using a result of the input utterance for retraining the ADS if the probability of correctly predicting the input utterance is below the dynamic threshold value.

19. The physical, non-transitory media of claim 18, wherein the instructions, when executed, dynamically select the set of predictions by determining a sequential pair of predictions in the ranked predictions between which the difference in corresponding probabilities is greatest relative to any other sequential pair of predictions, wherein the sequential pair of predictions include a first prediction and a second prediction, the first prediction having a higher probability than the second prediction.

20. The physical, non-transitory media of claim 19, wherein the instructions, when executed, classify the received input according to an accumulated probability of the set of predictions, and wherein the dynamic threshold value is modified based on the accumulated probability of the set of predictions.

21. The physical, non-transitory media of claim 19, wherein the instructions, when executed, dynamically select the set of predictions comprises identifying the set of predictions to include those predictions in a group bounded by a highest ranked prediction and the first prediction.

* * * * *